Sept. 14, 1965    J. P. BURGARELLA ETAL    3,205,799
SHUTTER TIMING APPARATUS
Filed March 29, 1963    2 Sheets-Sheet 1

INVENTORS
John P. Burgarella
and
BY Jeremy M. Topaz
Brown and Mikulka
Donald M. Sandler
ATTORNEYS Sept. 14, 1965     J. P. BURGARELLA ETAL     3,205,799

SHUTTER TIMING APPARATUS

Filed March 29, 1963     2 Sheets-Sheet 2

3,205,799
SHUTTER TIMING APPARATUS

John P. Burgarella, Sudbury, and Jeremy M. Topaz, Brighton, Mass., assignors to Polaroid Corporation, Cambridge, Mass., a corporation of Delaware
Filed Mar. 29, 1963, Ser. No. 269,116
15 Claims. (Cl. 95—10)

This invention relates to shutter control means for controlling the exposure time of a camera, and more particularly to shutter control means of the type that is responsive to light from a scene being photographed for causing the exposure time to be functionally related to the level of scene brightness.

One recently developed shutter control means of the type described is provided with shutter operator means actuatable to cause the shutter means of the camera to initiate exposure, and deactuatable to cause it to terminate exposure, so that the exposure time is essentially the time that said shutter operator means is actuated. To control this time, the control means is further provided with shutter timing apparatus including a voltage sensitive trigger circuit for actuating and deactuating the shutter operator means; and an R-C circuit having, as a component, a photoconductive element whose resistance is functionally related to the level of brightness of a scene to which the element is exposed. When the R-C circuit is actuated substantially at the same time the trigger circuit actuates the shutter operator means, it generates a time variable voltage that reaches a trigger voltage in a period of time dependent upon the parameters of the R-C circuit including the resistance of the element as established by the level of scene brightness.

The voltage sensitive trigger circuit includes an input transistor stage, the input signal to which is the time variable voltage of the R-C circuit. Such voltage causes the input stage to be biased to cut-off until the trigger voltage is reached, and when this occurs the stage is forward biased into conduction. During the time that the input stage is reverse biased, another transistor stage, operatively associated therewith, is permitted to conduct and is effective to actuate the shutter operator means; and when the input stage conducts, it causes the other stage to stop conducting and to deactuate the shutter operator means, so that the actual exposure time, as established by the actuation time of the shutter operator means, is essentially the time required by the R-C circuit, after activation, to generate the trigger voltage. Regenerative feedback between the stages causes conduction to rapidly switch in response to the generation of the trigger voltage.

Shutter means, with which the above-described apparatus is particularly well suited for use, may include a pair of movable blades, each having a blocking position overlying the exposure aperture of the camera and an unblocking position uncovering the aperture. Prior to the initiation of exposure, the opening blade is in blocking position and releasably retains the closing blade in unblocking position. When the opening blade moves to unblocking position, exposure is initiated because the shutter operator means, operably associated with the closing blade, is actuated and serves to releasably retain the latter in unblocking position; and exposure is terminated when the shutter operator means is deactuated to release the closing blade for movement to blocking position.

With shutter means in the form above-described, the shutter operator means may advantageously take the form of an electromagnet which is energized to attract the closing blade and maintain the latter in unblocking position after the opening blade moves to unblocking position, and deenergized to released the closing blade for movement to blocking position. When the electromagnet is to be energized at the last possible moment (that is, just prior to the time when the opening blade is no longer effective to retain the closing blade in unblocking position) the exposure time is essentially the time that the electromagnet is energized, which in this context is intended to describe the time that the shutter operator means is actuated.

One of the problems associated with cameras utilizing an electromagnet for the shutter control means is concerned with malfunctions in the operation thereof characterized by failure of the electromagnet to hold the closing blade against release as the opening blade moves to unblocking position, or to release the closing blade when the R-C circuit generates the trigger voltage. The former type of malfunction, in prematurely releasing the closing blade, can result in extreme underexposure, or even a failure to achieve any exposure. The latter type of malfunction, in belatedly releasing the closing blade, can result in overexposure or even a failure to release the closing blade. This failure to release the closing blade occurs generally at low levels of brightness.

The primary object of the present invention, therefore, is to solve the second-mentioned malfunction by providing shutter control means of the type described, which is effective in preventing, when the level of scene brightness is low, closing blade "hang-up," the term used to describe a malfunction in which the electromagnet fails to release the closing blade for terminating exposure in response to the trigger voltage generated by the R-C network.

Briefly, the invention involves the recognition that the current through the electromagnet must be reduced to a predetermined value (deenergized) for a finite period of time before the closing blade will respond to the so-called deactuation of the shutter operator means and move to blocking position to terminate exposure; plus a recognition that the regenerative feedback connection between the stages, while providing a rapid switch in conduction between the stages, also permits the capacitor means of the R-C circuit to discharge into the input stage when the latter is forward biased into conduction by the trigger voltage. However, when such discharge is complete and the light level is very low, the input stage cannot continue to conduct to a degree sufficient to maintain the other stage cut-off. The result is that the elecromagnet is reenergized before release of the closing blade is effected and blade recapture results. Having recognized the problem, the invention involves coupling the R-C circuit to the input stage through a relatively high impedance to decrease the discharge rate of the capacitor means of the R-C circuit without influencing the charging rate thereof. In this manner, even when the resistance of the photoconductive element is high, as at low levels of scene brightness, the electromagnet will be deenergized at least for the time necessary to effect release.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims appended hereto. Those skilled in the art will appreciate that the conception upon which this disclosure is based may readily be utilized as a basis for designing other structures for carrying out the several purposes of this invention. It is important, therefore, that the claims to be granted herein shall be of sufficient breadth to prevent the appropriation of this invention by those skilled in the art.

For a fuller understanding of the nature and objects of the invention, reference should be had to the following detailed description taken in connection with the accompanying drawings wherein.

The shutter control means to be described is shown in the drawing as embodied into a camera having a particular type of shutter means; but the latter is for the purpose of illustrating the invention in a simple environment, it being understood that other types of shutter means could also be used with the shutter control means disclosed and claimed herein in order to derive the new and improved results attendant thereto.

Figure 1:
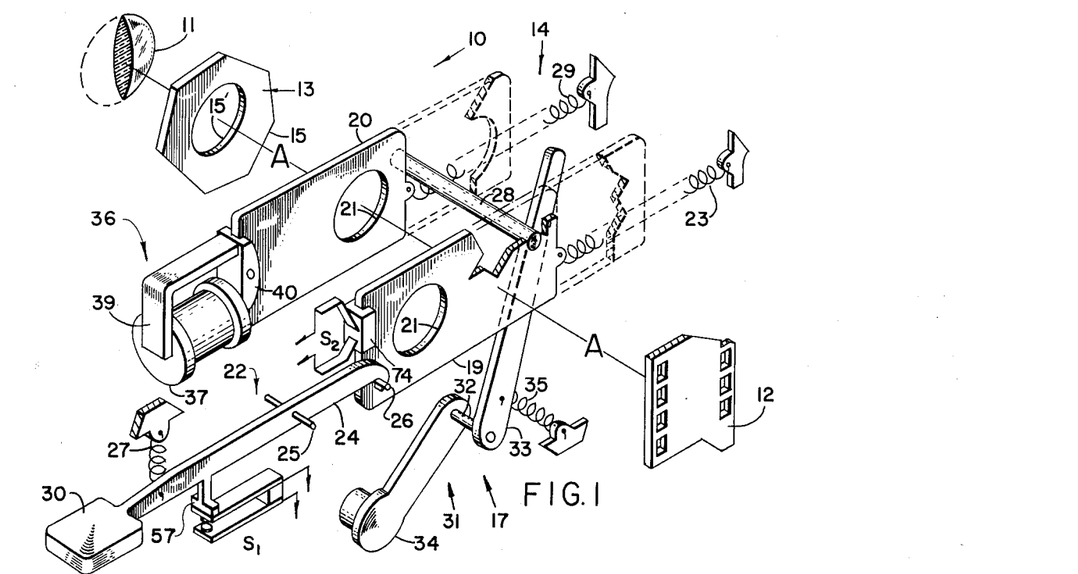
FIGURE 1 is a schematic representation of a camera of a type particularly well adapted for use with the present invention.

Referring now to FIGURE 1, camera 10 is shown schematically as including lens 11 for receiving light from a scene being photographed, and focusing it through an aperture in diaphragm means 13 onto film 12 to effect exposure of the latter by the proper operation of shutter mechanism 14 which is interposed in the optical path of the light.

Diaphragm 13 may take the form of a disc 15 mounted on the camera housing. Disc 15 contains exposure aperture 15' of preselected area aligned with the optical axis A—A of the camera.

Shutter mechanism 14 may include shutter means 17, and shutter control means 18. Shutter means 17 may take the form of a pair of planar, opaque blades 19 and 20, each provided with an exposure orifice 21, and mounted in tracks (not shown) so as to be normal to the optical axis, and reciprocable between terminal positions into intersection therewith. Each of the blades has one terminal position at which the solid portion overlies and totally blocks the exposure aperture in diaphragm means 13 (closed position), and another terminal position at which the exposure orifice is aligned with the exposure aperture (open position). Between these two terminal positions, each blade has an intermediate position at which it covers only a portion of the exposure aperture. In accordance with convention, it is assumed that the intermediate position at which half of the exposure aperture is covered is the position at which exposure is either initiated or terminated as the case may be. The blade that causes exposure to be initiated is called the "opening" blade. The terminal position at which the opening blade is closed is termed the "blocking" position, while the position intermediate the two terminal positions of the opening blade at which it initiates exposure is termed the "unblocking position." Conversely, the blade that causes exposure to be terminated is called the "closing" blade. The terminal position at which the closing blade is open is termed the "unblocking" position, while the position intermediate the two terminals positions of the closing blade at which it terminates exposure is termed the "blocking" position.

Prior to initiation of exposure, the blades are as shown in the solid lines of FIGURE 1, inspection of which will indicate that releasably coupling means 22 is engaged with opening blade 19 to hold the latter in blocking position against the bias of spring means 23 which urges the blade toward unblocking position. Coupling means 22 includes latch 24 pivotally mounted on pin 25 and engaged with latch pin 26 attached to blade 19. Latch spring 27 engaged with latch 24 urges the latter into latching contact with pin 26. Reset bar 28 is rigidly attached to the end of blade 19 opposite exposure orifice 21, and extends normal thereto into the path of movement of closing blade 20. When the opening blade is held in blocking position by coupling means 22, bar 28 is effective to engage blade 20 to maintain the latter open position against the bias of spring means 29 urging the closing blade toward its blocking position. As can be seen from the drawing, bar 28 does not interfere with the independent movement of opening blade 19 to its open position.

Such movement takes place upon manual depression of end portion 30 of latch 24, which rotates the latter about pivot 25 out of engagement with pin 26. Upon disengagement of coupling means 22 from opening blade 19, the latter moves out of blocking position toward open position, and bar 28 is no longer effective to maintain closing blade 20 in its open position. However, initial movement of opening blade 19, in response to the disengagement of coupling means 22 therefrom, is effective to cause shutter control means 18, in a manner to be described later, to retain closing blade 20 in its open position for a preselected period of time depending on the level of scene brightness. Since the opening blade moves to unblocking position while the shutter control means releasably retains the closing blade in open position, exposure is initiated. In other words, the shutter operator means is so operably associated with the shutter means, that the latter is caused to initiate exposure in response to actuation of the shutter operator means. At the end of said preselected period of time, shutter control means 18 causes closing blade 20 to be released thus terminating exposure when the latter is moved from open to blocking position by the action of bias spring means 29.

When exposure is terminated, blades 19 and 20 are in the position shown by the broken lines of FIGURE 1. That is to say, blade 19 is in open position and blade 20 is in blocking position, with reset bar 28 again engaged with blade 20. Having completed the exposure cycle, the blades are returned to their normal positions by reset mechanism 31 which includes reset shaft 32 rotatably mountd on the camera housing, reset lever 33 rigidly fixed to one end of shaft 32 and manual reset actuator 34 rigidly fixed to the other end of the shaft. Spring means 35 biases lever 33 to its normal position out of the path of movement of reset bar 28. However, the manual rotation of lever 33 against spring 35, achieved by the manual rotation of actuator 34 after exposure is terminated, causes lever 33 to engage bar 28 and move both blade 19 and blade 20 back to their normal, pre-exposure positions wherein the opening blade is in blocking position and the closing blade is in open position, the blades being held there by the action of coupling means 22. Upon release of actuator 34, lever 33 returns to its normal position, and the mechanism is ready for the next exposure cycle. If desired, the manual rotation of actuator 34 can be coupled to a film indexing mechanism.

Shutter control means 18 includes shutter operator means 36 actuatable to cause shutter means 17 to initiate exposure, and deactuatable after said preselected period of time to cause the shuter means to terminate exposure, as previously described. Specifically, operator means 36 may take the form of an electromagnet 37 which has solenoid 38 wound around one leg of U-shaped pole-piece 39, the free ends of which are coplanar and cooperable with magnetizable keeper 40 mounted on closing blade 20 when the latter is in open position. Pole-piece 39 and keeper 40, in such case, define a magnetic circuit of a particular reluctance such that a preselected magnetomotive force (solenoid current) applied to the magnetic circuit is sufficient to establish an attractive force between the pole-piece 39 and the keeper 40 that exceeds the separating force exerted on the closing blade by the biasing action of spring means 29 and is sufficient to resist dynamic loads due to the shock of the bottoming of the opening blade.

Shutter control means 18 further includes shutter timing apparatus 41, the purpose of which is to furnish an energizing current to the solenoid of electromagnet 37. Where the camera is to be portable and hence battery operated, it is essential to minimize current drain on the battery. With this in mind, premature release of closing blade 20 is prevented an accurate control of the time that the closing blade is held in unblocking position is obtained by rapidly energizing the solenoid just prior to the release of the opening blade, and effecting a rapid release of the closing blade by the electromagnet at the proper time.

The solenoid must be energized before opening blade 19 begins to move out of unblocking position, because this blade, through bar 28, serves to initially position keeper 40 in engagement with pole-piece 39. Once the keeper has separated even slightly from the pole-piece, the reluctance of the magnetic circuit is so high, that the solenoid current is unable to produce an attractive force that will overcome the force of spring 29 urging the closing blade to blocking position.

Figure 2:
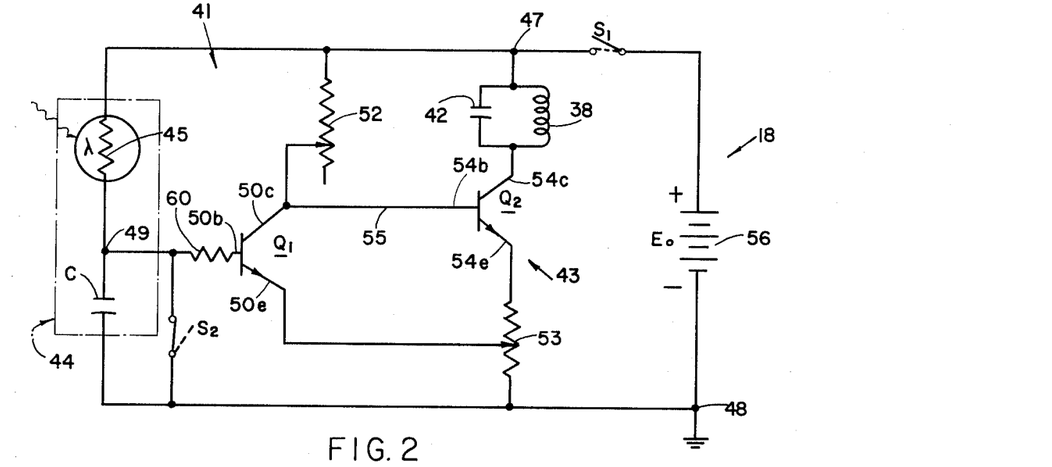
FIG. 2 is a schematic electrical diagram of the present invention.

Rapid release of the closing blade from the solenoid can be accomplished by rapidly decreasing the current furnished to the solenoid. When the current furnished to the solenoid is rapidly reduced, a voltage is induced thereacross due to the inductance of the solenoid. The induced voltage charges capacitor 42 which shunts the solenoid and prevents the induced voltage from damaging transistor $Q_2$. The current in the solenoid however, rapidly decays to the point where the magnetic induction is so reduced that the force of attraction of the pole-piece on the keeper is equal to the spring force urging separation. At this point, there is an initial movement of keeper 40 as the closing blade is drawn toward unblocking position by the spring bias. The time between the instant that the current in $Q_2$ is rapidly reduced and the instant that release of the closing blade is accomplished is very small in terms of the ordinary exposure interval, being only a fraction of a millisecond. For this reason, it is considered that the conduction of $Q_2$ is reduced, and movement of the closing blade begins at substantially the same time.

For the reasons set forth above, namely rapid switching of the current input to the solenoid and lower consumption, shutter timing apparatus 41 takes the form of a transistorized, two-stage, midfed Schmitt-type trigger circuit 43, responsive to the output voltage from network 44, for controlling the actuation and deactuation of shutter operator means 36. The voltage sensitive trigger circuit 43 has a normally not-conducting stage that includes transistor $Q_1$ preferably of a silicon type, having base, collector and emitter electrodes $50b$, $50c$ and $50e$ respectively. Collector electrode $50c$ of $Q_1$ is connected to terminal 47 of the shutter timing apparatus by variable bias resistor 52, and emitter electrode $50e$ of $Q_1$ is connected to terminal 48 of the shutter timing apparatus by variable bias resistor 53. The normally conducting stage of circuit 43 includes transistor $Q_2$ having base, collector and emitter electrodes $54b$, $54c$, and $54e$. Collector electrode $54e$ is connected to terminal 47 through solenoid 38 so that the latter is energized when $Q_2$ conducts. Base electrode $54b$ of $Q_2$ is connected to collector electrode $50c$ of $Q_1$ through lead 55, and emitter electrode $54e$ of $Q_2$ is connected through bias resistor 53 to terminal 48. It should be noted that with this arrangement there is essentially a common emitter resistor, the adjustment to resistor 53 being for the purpose of establishing the voltage at which it is desired to trigger circuit 43. While the two stages of circuit 43 have been characterized as "normally not-conducting" and "normally-conducting" it should be obvious that this characterization is applicable only when a voltage source is applied across terminals 47 and 48.

Figure 3:
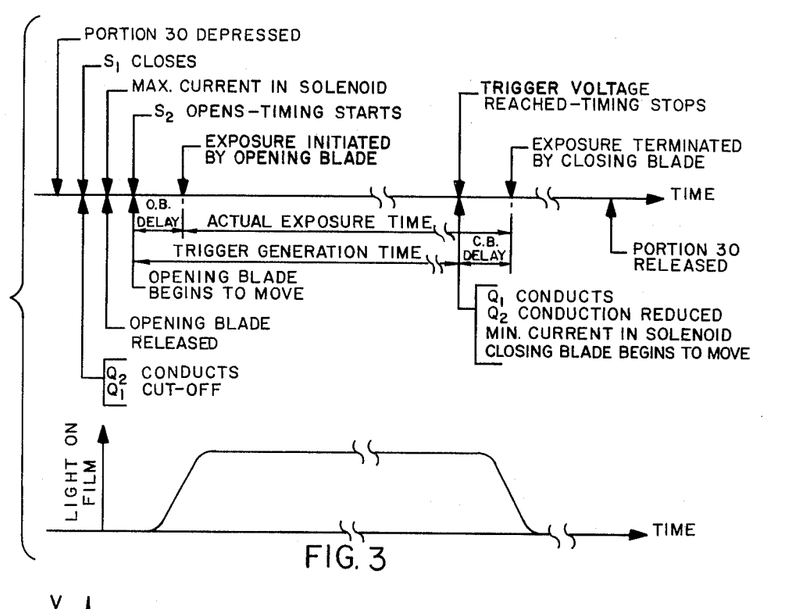
FIG. 3 is an expanded time-scale diagram for the purpose of illustrating the chronology of events associated with effecting exposure utilizing the camera of FIGURE 1 and the electrical system of FIG. 2.

In order to apply voltage source 56, shown in the form of a battery of potential $E_0$ connected from terminal 48 to terminal 47 through normally open switch S1, in such a way as to minimize current drain on the battery, actuator lever 24 is provided with switch operating arm 57 that is engageable with one of the contacts of switch S1. When the lever is manually depressed to disengage coupling means 22 from opening blade 19, the contacts of switch S1 will be closed. The sequence of events that occur as a result of the depression of end portion 30 will now be explained by making reference to the expanded time-scale diagram shown in FIG. 3. The initial depression of portion 30 closes the contacts of S1 before the rotation imparted to lever 24 effects its disengagement from pin 26. Since human reaction time involved in depressing lever 24, namely the time to depress the lever and release it, and the inertial delay of the lever in returning to its normal position, substanially exceeds the longest average exposure apt to be used under normal "snap-shot" conditions of scene brightness, the contacts of switch S1 will be closed for at least as long as the correct exposure time.

Inspection of $Q_2$ stage of circuit 43 indicates that base electrode $54b$ is the input to this stage, collector electrode $54c$ is the output, and emitter electrode $54e$ is common to the input and output. Resistor 52 coupled between input electrode $54b$ and terminal 47 acts as a fixed base resistor for providing, when S1 is closed, a fixed base current bias that causes $Q_2$ to conduct instantaneously with the closing of S1. The setting of variable resistor 52 establishes the degree to which $Q_2$ conducts so that the current through solenoid 38 can be adjusted to provide the proper magnetomotive force in the magnetic circuit of electromagnet 37 for preventing accidental release of closing blade 20 when the opening blade moves to unblocking position to initiate exposure. The flow of current through resistors 52 and 53, when $Q_2$ conducts, establishes at the collector and emitter electrodes of $Q_1$, bias voltages having first values dependent upon the magnitudes of the respective currents and resistance values.

Until the initial displacement of the opening blade out of its blocking position, conductive block 74 on the opening blade engages the contacts of S2 whereby the latter is closed. Connection 49 is at an initial value of voltage, namely ground potential, at the instant S1 is closed. When the voltage at connection 49 is at its initial value and the voltages at the collector and emitter electrodes of $Q_1$ are at their first values of bias voltage due to the conduction of $Q_2$, the collector-base and emitter-base junctions of $Q_1$ are reverse biased, thus resulting in $Q_1$ being cut off. For this reason, it may be said that the bias of $Q_1$ is primarily established by the voltage at connection 49.

Meanwhile, the current through the solenoid builds rapidly to its maximum value causing the maximum retaining force to be exerted on the closing blade shortly after S1 is closed and just prior to the total disengagement of lever 24 from pin 26 which releases the opening blade for movement out of blocking position. The initial movement of the opening blade causes conductive block 74 to disengage the contacts of S2 thereby opening the same to apply the voltage source across timing network 44 and activate the same. Network 44 includes capacitor means C in series with photoconductive element 45, such as a cadmium sulfide photocell or the like exposed to light from the scene being photographed and having a resistance inversely related to the level of scene brightness. Network 44 is connected between terminals 47, 48 of the shutter timing apparatus so as to form a conventional integrator circuit whose input terminal is at 47, and whose output terminal is at 49, the connection between the capacitor means and the photoconductive element. Terminal 49 is connected by fixed impedance 60 to base electrode 50b of $Q_1$, the latter electrode constituting the input electrode of that stage.

The opening of S2 activates network 44, which is to say that the latter is caused to generate, at connection 49, a voltage having an initial value (in this case ground potential) which causes $Q_1$ to be reverse biased to cut-off, and then changes with time reaching a preselected value, termed the trigger voltage, which forward biases $Q_1$, in a period of time termed the trigger generation time. The charge on capacitor means C changes after S2 is opened in response to the flow of a transient current, a portion of which flows through $Q_1$ while the latter is reverse biased and constitutes a leakage current, and a portion of which flows through element 45.

For a given transistor, the amount of leakage current is dependent upon the degree to which the junctions of the stage are reverse biased. As the transient current builds a charge on capacitor means C, the reverse biases are steadily reduced. However, the percentage of the current flowing through $Q_1$ as a leakage current that is effective in charging capacitor means C becomes substantial (exceeding 10%) at a low level of scene brightness, since the resistance of element 45 as established by the level of scene brightness, and the changing voltage difference across the element, controls the amount of current that can flow through the element. It can thus be seen that the trigger generation time will be dependent upon the parallel combination of the impedance of the stage to the flow of leakage current and the resistance of the element. As a result, the time required to reach the trigger voltage is shorter than would be the case were all of the charging current to flow through only element 45. In general, at low levels of scene brightness the trigger generation time is less than the correct exposure time because of the inherent nonlinear nature of the photoconductive element, without considering the effect of leakage current through $Q_1$. When the latter is considered, the trigger generation is still further shortened and substantial underexposure results.

To minimize the effect of leakage current on the trigger generation time at low levels of scene brightness, $Q_1$ is selected on the basis of its leakage current at reverse bias conditions imposed by the other elements of the shutter timing apparatus. Thus, the transistor $Q_1$ is a type having a leakage current associated therewith which is substantially smaller (less than 10%) than the current which flows through element 45 when the level of scene brightness is at the desired minimum level of brightness for which the camera is designed. Thus, at levels of brightness greater than such minimum level, substantially all of the transient current serving to charge capacitor means C flows through the photoconductive element, and the trigger generation time is essentially independent of the flow of leakage current. An example of a transistor suitable for this purpose is a silicon-planar transistor, similar to a 2N930.

When the voltage at connection 49 reaches the trigger voltage, it causes the emitter-base junction of $Q_1$ to be forward biased. Now, element 45 functions like a base resistor whose value is dependent upon the level of scene brightness and provides base current bias that causes $Q_1$ to conduct producing collector current at the output electrode thereof which flows through resistor 52 increasing the voltage drop thereacross and lowering the voltage at the input electrode of $Q_2$. This reduces the forward bias on $Q_2$ thus decreasing the flow of current through the latter and causing a reduction in the voltage drop across bias resistor 53 thereby increasing the forward bias on $Q_1$ even more. This regenerative feedback between the stages of voltage sensitive trigger circuit 43 will cause conduction to switch rapidly from $Q_2$ to $Q_1$, if sufficient collector current is available in $Q_1$. Assuming this is true, the different flows of current through bias resistors 52 and 53 after switching takes place establish second values of bias voltages at electrodes 50c and 50e of $Q_1$ such that the conduction of $Q_2$ is severely and rapidly reduced thereby rapidly deenergizing solenoid 38 to effect a sharp release of the closing blade.

When the closing blade is released, it begins to move out of unblocking position, and will terminate exposure at its blocking position as explained previously. Thus, the shutter means terminates exposure in response to deacutation of the shutter operator means. Referring again to FIG. 3, it can be seen that the time interval between when timing starts (the opening of S2) and when timing stops (the trigger voltage is reached), will be exactly the same as the time interval between when exposure is initiated and when exposure is terminated, provided only that the opening blade delay is the same as the closing blade delay, even though the two time intervals are not concurrent throughout. This disclosure assumes the delay times are essentially the same, so that the actual exposure time is essentially the same as the trigger generation time.

Referring again to FIG. 3, it is apparent that the time interval between the release of the opening blade and its initial movement to open S2 can be made extremely small by proper bias applied to the blade. Furthermore, the time between the closing of S1 and the attainment of maximum restraining force on the closing blade can likewise be made extremely small by various expedients. Thus, all the events that occur between the closing of S1 and the opening of S2 can be said to occur substantially at the same time, particularly since the time interval involved is a minute fraction of the actual exposure time. This disclosure therefore assumes that the actual exposure time is essentially the time that the current through the solenoid is sufficient to maintain the closing blade in unblocking position; or in other words, the time that the shutter operator means is actuated.

As indicated previously, the output current of $Q_1$ when the latter is forward biased into conduction must exceed a predetermined value in order to reduce the conduction of $Q_2$ to the point where spring means 29 becomes effective to separate keeper 40 from pole-piece 39 of the electro-magnet. In other words, it is quite possible for the voltage at connection 49 to reach the trigger voltage and forward bias $Q_1$ without causing release of the closing blade. This can occur when the resistance of element 45 is so high (low levels of scene brightness) that the current that is able to flow therethrough to establish fixed base current bias conditions for the $Q_1$ stage cannot cause the stage to produce an output current that exceeds the necessary predetermined value. State otherwise, the gain of the $Q_1$ stage must be sufficient so that when the level of scene brightness is at the minimal design level and the current through the element is at its lowest value, the output current must exceed the predetermined value identified above.

An unexpected advantage in this arrangement is obtained by the use of a silicon planar transistor for $Q_1$, since the current gain of transistors of this type is high enough to achieve the desired results, even when the level of scene brightness is reduced to 0.195 candles/ft.$^2$. Thus the trigger generation time is made substantially independent of the leakage current that results from reverse biasing $Q_1$, and positive release of the closing blade is assured when the electrical network generates the trigger voltage.

It should be understood that $Q_1$ need conduct only to the degree necessary to effect a reduction in the conduction of $Q_2$ sufficient for the magnetic induction of the electromagnet to be reduced to the point where the spring bias on the closing blade urging the latter toward blocking position overcomes the magnetic force exerted on the closing blade by the magnet. In other words, $Q_2$ need not be biased to cut-off to effect blade release. Thus, there exists a reduced level of conduction for $Q_2$ at which spring 29 is strong enough to overcome the magnetic force acting on the closing blade. The resulting current flowing through solenoid 38 can be said to deenergize the solenoid (deactuate the shutter operator means). Regardless of the amount of current flowing through solenoid 38 on deactuation, blade recapture can occur if conduction at the reduced level fails to continue for a given period of time depending on the response time of the blade to conduction at such reduced level. This means that any action that results in $Q_2$ conducting at a level greater than the level at which the solenoid is deenergized within said given period will cause the force exerted on the closing blade by the electromagnet to increase to the point where spring 29 is ineffective in securing release of the closing blade. This can occur even though the trigger voltage has been initially reached. In practice, this difficulty occurs frequently when the level of scene brightness is low, which is to say, when the output current of $Q_1$ is just slightly less than that necessary to cause $Q_2$ to conduct at the reduced level necessary to deactuate the shutter operator means.

In attempting to obviate this difficulty, it was discovered that when $Q_1$ is forward biased by the trigger voltage and begins to conduct, the regenerative feedback connection between $Q_1$ and $Q_2$, while providing a rapid switch in conduction between the stages, also permits capacitor means C of network 44 to discharge into the base electrode 50b of $Q_1$, into emitter electrode 50e and to ground through resistor 53. Because the input impedance of $Q_1$ is generally low for a transistor type having satisfactory current gain and resistance to leakage current characteristics, the discharge of C is very rapid. The collector current of $Q_1$ is the product of its gain and the base current, the latter being composed of the current from the discharge of C and the current flowing through element 45 as a result of the voltage difference thereacross. Such collector current will be sufficient, even at very low light levels where the contribution of the current flowing through element 45 is very small, to rapidly drive $Q_2$ to cut-off, or at least to such a reduced degree of conduction that for practical purposes, it may be said that the solenoid is deenergized (shutter operator means deactuated). However, after C is discharged, the base current in $Q_1$ is limited to the current able to flow through element 45. Thus, below a certain light level, the resistance of element 45 will be so high that $Q_1$ does not have sufficient gain to produce the collector current necessary to keep $Q_2$ in its cut-off condition; and after being cut-off for a very short time (discharge time of C) $Q_2$ conducts and reenergizes the solenoid before keeper 40 has separated from the pole piece of the electromagnet, and blade recapture results.

By coupling connection 49 to the input electrode of $Q_1$ through impedance 60, the rate at which capacitor means C can discharge will be limited. The value of this impedance is made large in comparison to the input impedance of $Q_1$ when the latter is forward biased so that impedance 60 constitutes means effective at low levels of scene brightness for causing trigger circuit 43 to deactuate shutter operator means 36 for at least the required time.

The use of impedance 60 has no effect on the operation of the device under conditions where the resistance of element 45 is low enough so that the current therethrough times the gain of $Q_1$ is sufficient to maintain $Q_2$ cut-off. The presence of the impedance increases the release time of the keeper from the pole piece, which is to say the time between when the current in the solenoid is switched off to when the keeper has moved sufficiently far to prevent blade recapture. While this factor might appear to detrimentally affect exposure by lengthening the time interval during which light is permitted to reach the film, this is not the case, since this situation arises only at low light levels where the correct exposure time is extremely large in comparison to the incremental increase in release time. For comparison purposes, the light level at which blade hang-up was a problem might require an exposure of the order of magnitude of $\frac{1}{10}$ second while the incremental increase in release time might be of the order of magnitude of $\frac{1}{5000}$ second.

Figure 4:
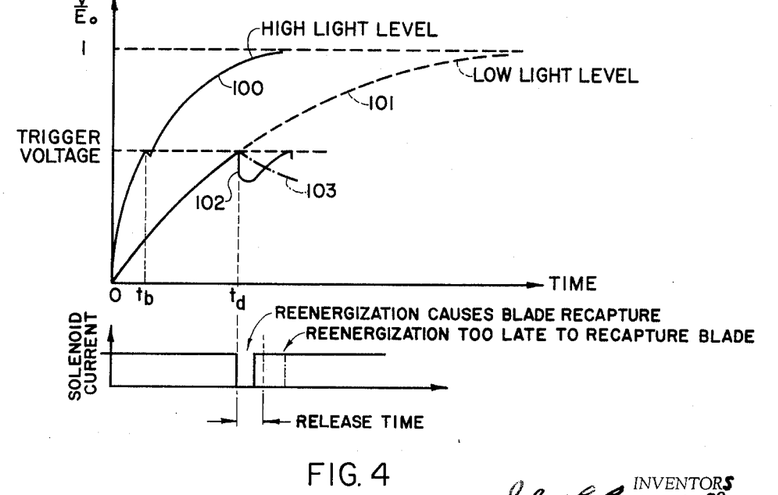
FIG. 4 is a voltage-time plot showing the variation of voltage generated by the R-C circuit after activation thereof.

FIG. 4 shows, qualitatively, the problem and its solution. At relatively high levels of scene brightness, where the resistance of the photoconductive element is low, the voltage at connection 49 as a function of time varies generally in accordance with curve 100. The discontinuity occurring at time $t_b$ is due to the change in the input impedance of $Q_1$ that occurs when the trigger voltage is reached. The nature of the discontinuity is exaggerated in the drawing for the purposes of illustrating what occurs, although the discontinuity practically disappears at very high levels of scene brightness. The contribution of the current in resistor 53 due to the discharge of capacitor means C decreases as the resistance of element 45 decreases since the degree to which $Q_1$ conducts is directly related to the resistance of the element. Thus, the discharge of the capacitor means at high light levels has little effect on changing the current output of $Q_2$.

However, at low light levels, the resistance of element 45 is high, and the current through resistor 53 due to the discharge of the capacitor means has the effect shown at curve 101. Without impedance 60, the voltage at connection 49 drops rapidly at the base of $Q_1$ as soon as the trigger voltage is reached and $Q_1$ is forward biased. This is indicated in an exaggerated manner at 102. With impedance 60 present, the voltage drops less rapidly as indicated at 103. As a result, the electromagnet is deenergized for at least the time required for the closing blade to move slightly and separate keeper 40 from the pole piece 39.

Since certain changes may be made in the above method and apparatus without departing from the scope of the invention herein involved, it is intended that all matter contained in the above description or shown in the accompanying drawings shall be interpreted as illustrative and not in a limiting sense.

What is claimed is:
1. In a camera having shutter means for controlling exposure, the combination of:
 (a) shutter operator means constructed and arranged so that said shutter means is caused to initiate exposure in response to actuation of said shutter operator means and caused to terminate exposure only when said shutter operator means is deactuated for at least a given period of time;
 (b) a voltage sensitive trigger circuit, including a transistor stage having an input, for actuating and deactuating said shutter operator means;
 (c) means for causing said voltage sensitive trigger circuit to actuate said shutter operator means;
 (d) an electrical network including capacitor means coupled to a photoresponsive element that is exposed to light from a scene being photographed and has a resistance inversely related to the level of scene brightness;
 (e) means coupling the capacitor means of said network to said input;
 (f) said network being so constructed and arranged that when activated, the charge on said capacitor means begins to change causing the voltage at said input to change from an initial value, which reverse biases said stage to cut-off, to a preselected value termed the trigger voltage, which forward biases said stage into conduction, in a period of time termed the trigger generation time;
 (g) means to activate said network substantially at the same time said voltage sensitive trigger circuit actuates said shutter operator means; and
 (h) means effective at low levels of scene brightness for causing said voltage sensitive trigger circuit to deactuate said shutter operator means for at least said given period of time when said stage is forward biased into conduction by the trigger voltage, whereby the actuation time of said shutter operator means, and consequently the exposure time, is essentially equal to the trigger generation time.

2. In a camera having shutter means for controlling exposure, the combination of:
   (a) shutter operator means constructed and arranged so that said shutter means is caused to initiate exposure in response to actuation of said shutter operator means and caused to terminate exposure only when said shutter operator means is deactuated for at least a given period of time;
   (b) a voltage sensitive trigger circuit, including a transistor stage having an input, for actuating and deactuating said shutter operator means;
   (c) means for causing said voltage sensitive trigger circuit to actuate said shutter operator means;
   (d) an electrical network including capacitor means coupled to a photosensitive element that is exposed to light from a scene being photographed and has a resistance inversely related to the level of scene brightness;
   (e) impedance means coupling the capacitor means of said network to said input;
   (f) said network being so constructed and arranged that when activated, the charge on said capacitor means begins to change causing the voltage at said input to change from an initial value, which reverse biases said stage to cut-off, to a preselected value termed the trigger voltage, which forward biases said stage into conduction, in a period of time termed the trigger generation time;
   (g) means to activate said network substantially at the same time said voltage sensitive trigger circuit actuates said shutter operator means; and
   (h) said impedance means causing said voltage sensitive trigger circuit to deactuate said shutter operator means for at least said given period of time when said stage is forward biased into conduction by the trigger voltage, whereby the actuation time of said shutter operator means, and consequently the exposure time, is essentially equal to the trigger generation time.

3. Apparatus in accordance with claim 2 wherein said impedance means is large in comparison to the input impedance of said transistor stage when the latter is forward biased by the trigger voltage.

4. In a camera having shutter means for controlling exposure, the combination of:
   (a) shutter operator means constructed and arranged so that said shutter means is caused to initiate exposure in response to actuation of said shutter operator means and caused to terminate exposure only when said shutter operator means is deactuated for at least a given period of time;
   (b) a voltage sensitive trigger circuit, including a transistor stage having an input, for actuating and deactuating said shutter operator means;
   (c) means for causing said voltage sensitive trigger circuit to actuate said shutter operator means;
   (d) an electrical network including capacitor means coupled to a photoresponsive element that is exposed to light from a scene being photographed and has a resistance inversely related to the level of scene brightness;
   (e) impedance means coupling the capacitor means of said network to said input;
   (f) said network being so constructed and arranged that when activated, the charge on said capacitor means begins to change causing the voltage at said input to change from an initial value, which reverse biases said stage to cut-off, to a preselected value termed the trigger voltage, which forward biases said stage into conduction, in a period of time termed the trigger generation time;
   (g) means to activate said network substantially at the same time said voltage sensitive trigger circuit actuates said shutter operator means; and
   (h) said impedance means being large in comparison to the input impedance of said transistor stage when the latter is forward biased by the trigger voltage for limiting discharge of said capacitor means into said stage whereby said voltage sensitive trigger circuit is effective to deactuate said shutter operator means for at least said given period of time when said stage is forward biased into conduction by the trigger voltage.

5. In a camea having shutter means for controlling exposure, the combination of:
   (a) shutter operator means constructed and arranged so that said shutter means is caused to initiate exposure in response to actuation of said shutter operator means and caused to terminate exposure only when said shutter operator means is deactuated for at least a given period of time;
   (b) a first transistor stage for actuating said shutter operator means when said stage has a first forward bias thereon resulting in conduction of the latter at a predetermined level, and for deactuating said shutter operator means when said stage has a reduced forward bias thereon resulting in conduction of the latter at a reduced level for at least said given period of time;
   (c) means for establishing on said first stage said first forward bias resulting in its conduction at said predetermined level whereby said shutter means is actuated and exposure is initiated;
   (d) a second transistor stage coupled to said first stage so that said second stage, when reverse biased to cut-off, effects conduction of said first stage at said predetermined level; and, when forward biased and conducting, reduces the forward bias on said first stage in proportion to the degree to which said second stage conducts;
   (e) an electrical network including capacitor means, a photoresponsive element exposed to light from a scene being photographed and having a resistance inversely related to the level of scene brightness, and a connection between said capacitor means and said element;
   (f) means connecting said connection to said second stage so that the bias thereon is primarily established by the voltage at said connection;
   (g) said network being so constructed and arranged that when activated, the charge on said capacitor means begins to change causing the voltage at said connection to change from an initial value, which reverse biases said second stage to cut-off, to a preselected value termed the trigger voltage, which forward biases said second stage, in a period of time termed the trigger generation time;
   (h) the degree to which said second stage conducts depending upon the resistance of said element so that at low levels of scene brightness, said second stage conducts to a degree sufficient to reduce conduction of said first stage to a level no higher than said reduced level;
   (i) said capacitor means tending to discharge through said second stage when the latter is forward biased thereby tending to decrease the forward bias thereon and increase conduction of said first stage to a level above said reduced level; and
   (j) means to limit the discharge of said capacitor means through said second stage, when the latter is forward biased, to the extent that at low levels of scene brightness, conduction of said first stage remains at a level no higher than said reduced level for said given period of time.

6. In a camera having shutter means for controlling exposure, the combination of:
  (a) shutter operator means constructed and arranged so that said shutter means is caused to initiate exposure in response to actuation of said shutter operator means and caused to terminate exposure only when said shutter operator means is deactuated for at least a given period of time;
  (b) a first transistor stage for actuating said shutter operator means when said stage has a first forward bias thereon resulting in conduction of the latter at a predetermined level, and for deactuating said shutter operator means when said stage has a reduced forward bias thereon resulting in conduction of the latter at a reduced level for at least said given period of time;
  (c) means for establishing on said first stage said first forward bias resulting in its conduction at said predetermined level whereby said shutter means is actuated and exposure is initiated;
  (d) a second transistor stage coupled to said first stage so that said second stage, when reverse biased to cut-off, effects conduction of said first stage at said predetermined level; and, when forward biased and conducting, reduces the forward bias on said first stage in proportion to the degree to which said second stage conducts;
  (e) an electrical network including capacitor means, a photoresponsive element exposed to light from a scene being photographed and having a resistance inversely related to the level of scene brightness, and a connection between said capacitor means and said element;
  (f) impedance means connecting said connection to said second stage so that the bias thereon is primarily established by the voltage at said connection;
  (g) said network being so constructed and arranged that when activated, the charge on said capacitor means begins to change causing the voltage at said connection to change from an initial value, which reverse biases said second stage to cut-off, to a preselected value termed the trigger voltage, which forward biases said second stage, in a period of time termed the trigger generation time;
  (h) the degree to which said second stage conducts depending upon the resistance of said element so that at low levels of scene brightness, said second stage conducts to a degree sufficient to reduce conduction of said first stage to a level no higher than said reduced level;
  (i) said capacitor means tending to discharge through said second stage when the latter is forward biased thereby tending to decrease the forward bias thereon and increase conduction of said first stage to a level above said reducel level; and
  (j) said impedance means serving to limit discharge of said capacitor means through said second stage, when the latter is forward biased, to the extent that at low levels of scene brightness, conduction of said first stage remains at a level no higher than said reduced level for said given period of time.

7. Apparatus in accordance with claim 6 wherein said impedance means has a value which is larger in comparison to the impedance of the input to said second stage.

8. In a camera having shutter means for controlling exposure, the combination of:
  (a) shutter operator means constructed and arranged so that said shutter means is caused to initiate exposure in response to actuation of said shutter operator means and caused to terminate exposure only when said shutter operator means is deactuated for at least a given period of time;
  (b) a pair of terminals;
  (c) a first transistor having an input electrode constituted by the base thereof, an output electrode, and a common electrode;
  (d) means coupling said shutter operator means between said output electrode and one of said terminals;
  (e) means coupling said common electrode to the other terminal;
  (f) means coupling a fixed base resistor between said input electrode and said one terminal for providing, when a voltage source is connected between said terminals, a fixed base current bias that causes said first transistor to conduct and actuate said shutter operator means to initiate exposure;
  (g) a second transistor having an input electrode constituted by the base thereof, an output electrode and a common electrode;
  (h) means coupling the output electrode of said second transistor to the input electrode of said first transistor so that the output current of said second transistor flows through said fixed base resistor and reduces the forward bias on said first transistor to a level which causes a reduction in the conduction of said first transistor;
  (i) means coupling the common electrode of said second transistor to the common electrode of said first transistor;
  (j) an electrical network connected between said terminals;
  (k) said network including capacitor means, a photoresponsive element exposed to light from said scene and having a resistance inversely related to the level of scene brightness, said element being connected to said one terminal, and a connection between said capacitor means and said element;
  (l) means connecting said connection to the input electrode of said second transistor;
  (m) said network being so constructed and arranged that when activated the voltage at said connection has an initial value which reverse biases said second transistor to cut-off and then changes with time reaching a preselected value, termed the trigger voltage, which forward biases said second transistor in a period of time termed the trigger generation time;
  (n) means to connect a voltage source between said terminals and to activate said network substantially at the same time said first stage is biased into conduction whereby said first transistor conducts and said shutter operator means is actuated for a period of time at least equal to the trigger generation time; and
  (o) means for causing the output current of said second transistor to reduce the forward bias on said first transistor to a level which reduces conduction of the latter and results in deactuation of said shutter operator means for at least said given period of time.

9. A shutter mechanism for a camera having an exposure aperture for photographing a scene, comprising:
  (a) shutter means selectively movable into blocking and unblocking position relative to said exposure aperture for controlling the passage of incident light therethrough;
  (b) electromagnetic means operably associated with said shutter means and being so constructed and arranged that the latter is caused to initiate exposure in response to energization of said electromagnetic means and to terminate exposure in response to de-energization of said electromagnetic means for at least a given period of time;
  (c) a pair of terminals;
  (d) a first transistor having an input electrode constituted by the base thereof, an output electrode, and a common electrode;
  (e) means coupling said electromagnetic means between said output electrode and one of said terminals so that said electromagnetic means is energized when said first transistor conducts at a first level and deenergized when conduction of the latter is reduced to a second level;

(f) means coupling said common electrode to the other terminal;

(g) means coupling a fixed base resistor between said input electrode and said one terminal for providing, when a voltage source is connected between said terminals, a fixed base current bias that causes said first transistor to conduct at said first level and energize said electromagnetic means to initiate exposure;

(h) a second transistor having an input electrode constituted by the base thereof, an output electrode and a common electrode;

(i) means coupling the output electrode of said second transistor to the input electrode of said first transistor so that the output current of said second transistor flows through said fixed base resistor and reduces the forward bias on said first transistor to a level which reduces conduction of said first transistor;

(j) means coupling the common electrode of said second transistor to the common electrode of said first transistor;

(k) an electrical network connected between said terminals;

(l) said network including capacitor means, a photoresponsive element exposed to light from said scene and having a resistance inversely related to the level of scene brightness, said element being connected to said one terminal, and a connection between said capacitor means and said element;

(m) means connecting said connection to the input electrode of said second transistor;

(n) said network being so constructed and arranged that when activated, the voltage at said connection has an initial value which reverse biases said second transistor to cut-off and then changes with time reaching a preselected value, termed the trigger voltage, which forward biases said second transistor in a period of time termed the trigger generation time;

(o) means to connect a voltage source between said terminals to activate said network substantially at the same time said first stage is biased into conduction whereby said first transistor conducts at said first level to energize said electromagnetic means for a period of time at least equal to the trigger generation time; and (p) means for causing the output current of said second transistor to reduce the forward bias on said first transistor to a level which reduces conduction of the latter to said second level and results in deenergization of said electromagnetic means for at least said given period of time.

10. Apparatus in accordance with claim 9 wherein said means connecting said connection to the input electrode of said second transistor includes a fixed impedance which serves to limit discharge of said capacitor means through said second transistor when the latter is forward biased.

11. Apparatus in accordance with claim 10 wherein said fixed impedance has a value which is large in comparison to the input impedance to said second stage.

12. A shutter mechanism for a camera having an exposure aperture for photographing a scene, comprising:

(a) at least one shutter blade movable into blocking and unblocking position relative to said exposure aperture for controlling the passage of incident light therethrough;

(b) electromagnetic means operably assoicated with said shutter means when the latter is in unblocking position such that energization of said electromagnetic means causes the latter to attract said blade and maintain the same in unblocking position;

(c) a pair of terminals;

(d) a first transistor having an input electrode constituted by the base thereof, an output electrode, and a common electrode;

(e) means coupling said electromagnetic means between said output electrode and one of said terminals so that said electromagnetic means is energized when said first transistor conducts at a first level and deenergized when conduction of the latter is reduced to a second level;

(f) means coupling said common electrode to the other terminal;

(g) means coupling a fixed base resistor between said input electrode and said one terminal for providing, when a voltage source is connected between said terminals, a fixed base current bias that causes said first transistor to conduct at said first level and energize said electromagnetic means;

(h) a second transistor having an input electrode constituted by the base thereof, an output electrode and a common electrode;

(i) means coupling the output electrode of said second transistor to the input electrode of said first transistor so that the output current of said second transistor flows through said fixed base resistor and reduces the forward bias on said first transistor to a level which reduces conduction of said first transistor;

(j) means coupling the common electrode of said second transistor to the common electrode of said first transistor;

(k) an electrical network connected between said terminals;

(l) said network including capacitor means, a photoresponsive element exposed to light from said scene and having a resistance inversely related to the level of scene brightness, said element being connected to said one terminal, and a connection between said capacitor means and said element;

(m) impedance means connecting said connection to the input electrode of said second transistor;

(n) said network being so constructed and arranged that when activated, the voltage at said connection has an initial value which reverse biases said second transistor to cut-off and then changes with time reaching a preselected value, termed the trigger voltage, which forward biases said second transistor in a period of time termed the trigger generation time;

(o) means to connect a voltage source between said terminals to activate said network substantially at the same time said first stage is biased into conduction whereby said first transistor conducts at said first level to energize said electromagnetic means for a period of time at least equal to the trigger generation time and then conducts at said second level to deenergize said electromagnetic means;

(p) said impedance means being large in comparison to the input impedance of said second transistor when the latter is forward biased by the trigger voltage; and (q) means effective to move said shutter means to blocking position after said electromagnetic means is de-energized.

13. In a shutter mechanism having shutter blades cooperable with an electromagnet and constructed and arranged so that said blades effect exposure during the time said electromagnet is energized and terminate exposure when said electromagnet is de-energized for at least a given period of time; and a timing circuit including a capacitor across which a time variable voltage is developed when exposure is initiated; a voltage-sensitive trigger circuit comprising:

(a) a first transistor stage which conducts when exposure is initiated, said electromagnet being in the output circuit of said first stage and being energized when the latter conducts;

(b) a second transistor stage, to the input of which said capacitor is connected when exposure is initiated, for biasing of said second stage until the voltage on said capacitor reaches said trigger level;
(c) a regenerative feedback connection between said stages for causing said first stage to stop conducting when the second stages start conducting, thereby rapidly de-energizing said electromagnet; and
(d) means for causing said electromagnet to remain de-energized, when the scene brightness is at low levels, for at least said given period.

14. Apparatus in accordance with claim 13 wherein the time constant associated with the discharge of said capacitor through said second transistor when the latter conducts at such low levels of scene brightness is long in comparison to said given period.

15. Apparatus in accordance with claim 14 wherein said capacitor is coupled to said second stage through an impedance larger in magnitude than the input impedance of said second stage when the latter conducts.

References Cited by the Examiner
UNITED STATES PATENTS 3,020,816 2/62 Frenk ______________ 95—58
3,063,354 11/62 Matulik _____________ 95—10

NORTON ANSHER, *Primary Examiner.*